United States Patent [19]
Benson et al.

[11] Patent Number: 5,110,163
[45] Date of Patent: May 5, 1992

[54] PIPE FITTING WITH IMPROVED COUPLING BODY

[75] Inventors: Robert W. Benson, San Carlos; Christopher G. Dietemann, San Francisco; Mark J. Beiley, Daly City; Sohel A. Sareshwala, San Leandro, all of Calif.

[73] Assignee: Lokring Corporation, Forster City, Calif.

[21] Appl. No.: 497,505

[22] Filed: Mar. 22, 1990

[51] Int. Cl.⁵ .............................................. F16L 13/14
[52] U.S. Cl. .................................. 285/382.2; 285/417
[58] Field of Search ............... 285/382.2, 382.1, 382.7, 285/417, 259; 29/508, 520, 521

[56] References Cited

U.S. PATENT DOCUMENTS

| | | | |
|---|---|---|---|
| 2,816,781 | 12/1957 | Woodling | 285/259 X |
| 3,498,648 | 3/1970 | Hallesy | 285/382.2 X |
| 4,061,367 | 12/1977 | Moebius | 285/382.2 |
| 4,482,174 | 11/1984 | Puri | 285/382.2 |

*Primary Examiner*—Dave W. Arola
*Attorney, Agent, or Firm*—Fliesler, Dubb, Meyer & Lovejoy

[57] ABSTRACT

A pipe coupling including a coupling body and swage rings for urging over the coupling body in order to secure the pipes together. The coupling body includes a main sealing tooth with an outboard isolation tooth and an inboard tooth located on opposite sides of the main sealing tooth. First and second grooves are defined between the main sealing tooth and the outboard isolation tooth and the inboard tooth, which grooves are of sufficient length and depth so that pipe secured by the coupling is not substantially deformed adjacent the first and second grooves in order to enhance the ability of the main sealing tooth to bite into the pipe in order to provide a hermetic seal and also to increase the resistance of the coupling to tensile loads. The outboard isolation tooth and inboard tooth protect the seal created by the main sealing tooth from external forces caused by bending. The main sealing tooth can include a twin tooth having a parent tooth and one or more sealing teeth extending therefrom.

35 Claims, 6 Drawing Sheets

FIG.—1

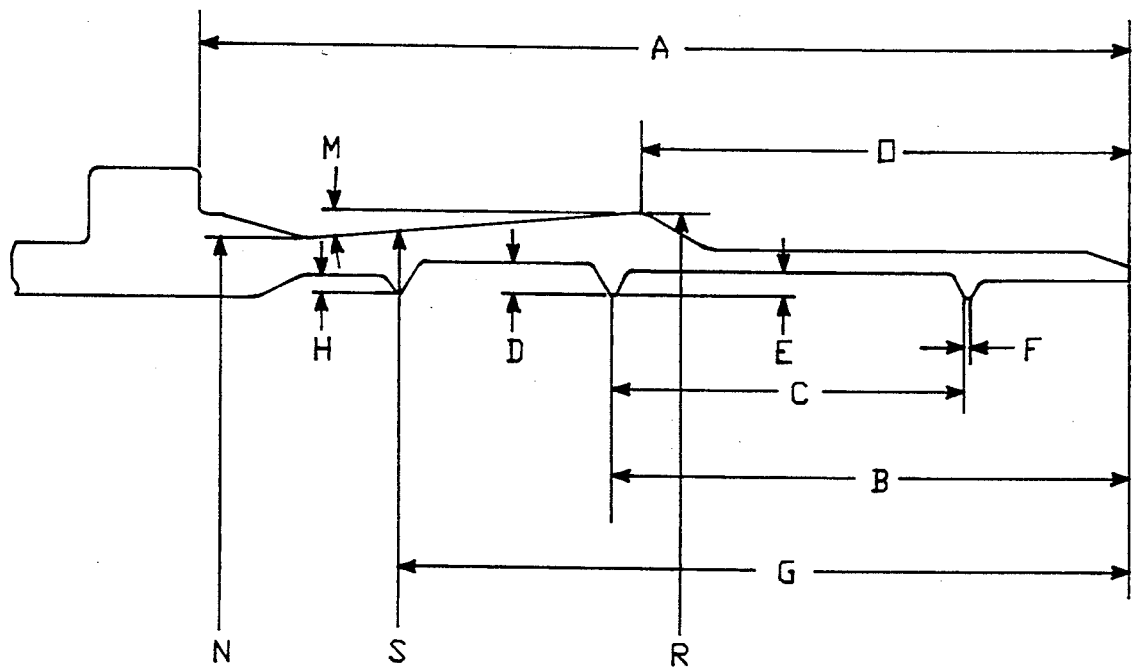
FIG.—7A
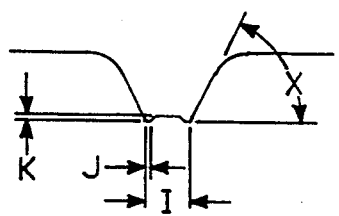
FIG.—7B

PIPE FITTING WITH IMPROVED COUPLING BODY

FIELD OF THE INVENTION

The present invention is directed to a pipe fitting which allows pipes to be joined and sealed together with a mechanical fitting.

BACKGROUND OF THE INVENTION

Currently available are a number of mechanical fittings which allow the joining together of two or more pipes or tubes through the application of mechanical force. The pipe fitting generally involves the deformation of a portion of the tube or pipe and a portion of the fitting itself when mechanical force is applied. A successful example of a tube fitting is described in U.S. Pat. No. 4,482,174 issued on Nov. 13, 1984 and entitled "APPARATUS AND METHOD FOR MAKING A TUBE CONNECTION," which patent is under license to the present assignee and which patent is incorporated herein by reference. This patent describes a tube fitting for joining two tubes together which include a coupling body having an inner cylindrical surface and an outer cylindrical surface and first and second swage rings. The swage rings can be mechanically urged over the outer surface of the coupling body from the first and second ends, respectively, of the coupling body. The two tubes to be joined are inserted into the first and second ends of the coupling body, respectively. The inner surface of the coupling body includes one or more teeth which are urged into engagement with the tubes in order to provide a mechanical seal. The outer surface of the coupling body includes protrusions. When the swage rings are urged over the coupling body, the swage rings force the protrusion inwardly causing the teeth to be urged into biting engagement with the pipe creating the above mechanical seal and connection. Such devices use one or more teeth and/or protrusions.

While the above fitting has proved to be highly successful, improvements have been developed which enhance the mechanical sealing and connection function.

SUMMARY OF THE INVENTION

The present invention provides for a pipe fitting with an advantageously improved coupling body. It is an object of the present invention to provide for a pipe fitting which has enhanced tensile strength making it more difficult for the pipes or tubes to be pulled out of the fitting along an axial direction.

It is an object of the present invention to provide for a pipe fitting that can withstand high burst pressures which can be responsible in part for tensile loading.

It is yet another object of the present invention to provide for a pipe fitting which has an enhanced ability to seal tubes with irregular surfaces, namely outside diameter surface imperfection such as handling scratches and the like.

It is yet a further object of the present invention to provide for a pipe fitting which prevents bending, rooking or flexing of the pipe about the point where the mechanical seal is made between the pipe fitting and the pipe.

It is still another object of the present invention to provide a pipe fitting which has a plurality of teeth with grooves defined between the teeth, which grooves have sufficient dimensions so that the pipe to be joined is not substantially deformed in the area between adjacent teeth. Such an arrangement is particularly advantageous for a thin walled pipe as the grooves with such dimensions will not push the pipe away from the teeth so as not to reduce the sealing effectiveness of the teeth. Further, such an arrangement is resistant to failure due to rooking or bending of the pipe about the fulcrum created by the engagement of the main sealing tooth with the pipe.

It is yet another object of the present invention to provide a tooth to create a hermetically sealed joint by biting into the outside surface of the pipe.

It is yet a further object of the present invention to ensure that the tooth has enough strength to withstand a high burst pressure, and tensile shear along an axial direction.

It is a further object of the present invention to provide a pipe fitting with an enhanced sealing capability wherein a twin tooth arrangement is utilized which offers an increased tensile strength and an enhanced seal, especially around irregular pipe surfaces, namely outside diameter surface imperfections such as handling scratches and the like.

It is still a further object of the invention to provide a tooth arrangement having a parent tooth which can withstand the necessary burst pressures and tensile shear, and extending from the parent tooth one or several sealing teeth which can create a hermetically sealed joint by biting into the outer surface of the pipe.

Still another object of the present invention is to provide the sealing teeth extending from the parent teeth with knife edges so that sealing teeth can bite into the outer surface of the pipe and at the same time mushroom and smash themselves against the outer surface of the pipe to fill cracks, crevices and any other surface imperfections on the outside of the pipe. The parent tooth, being substantially larger than the sealing teeth, provides the necessary tensile shear strength once the sealing teeth have been smashed against the outside of the pipe. The parent tooth also provides high compression strengths to deform thick wall pipes. Such an arrangement is particularly advantageous on a thin wall pipe as such a tooth arrangement provides thin, sharp sealing teeth for biting into the pipe and a larger parent tooth for withstanding tensile loading as opposed to a single tooth which could have a tendency, with respect to thin walled pipes, to deform the pipe without biting into the surface. The same tooth arrangement would be advantageous for a thick walled pipe as the several sealing teeth would bite into the outer surface of the pipe with the parent tooth supporting the necessary tensile loading.

In accordance with the invention, an apparatus is provided for making pipe and tube connections which comprises a coupling body with an inner surface adapted for receiving a pipe or tube and an outer surface. A swage ring is provided which can be urged onto the outer surface in order to cause at least part of the inner surface to engage the pipe to create a seal. The inner surface of the coupling body describes a first main seal tooth for making a substantial bite into the pipe as the swage ring is urged over the outer surface. The inner surface further describes a second isolation tooth for making at least a minimal bite, and preferably a bite less than or equal to the bite of the first main seal tooth, into the pipe as the swage ring is urged over the outer surface. A groove is defined between the first main seal tooth and second isolation tooth with the groove having a length between the first main seal tooth and second isolation tooth means and a depth. The length and depth of the grooves are selected so that the portion of the pipe located between the first main seal tooth and second isolation tooth is substantially retained in its initial shape after the swage ring has caused the first and second tooth to bite into the pipe. Such an arrangement increases the tensile strength of the arrangement as the original outer diameter of the pipe must be overcome in order to have the pipe actually pull out of the coupling. As the coupling body is designed not to deform the pipe in the area of the grooves, the pipe is not pushed away from the first main seal tooth and thus the effectiveness of the first main seal tooth in biting into the pipe is not diminished. Further, the second isolation tooth being spaced from the first tooth resists the rocking or flexing of the pipe about a fulcrum which is established by the first main seal tooth preventing failure of the main seal tooth and resultant leakage.

In another aspect of the invention, the inner surface describes a third inboard tooth for making at least a minimal bite into the pipe as the swage ring is urged over the outer surface. The third inboard tooth is located on the opposite side of the first main seal tooth from the second isolation tooth. The third inboard tooth assists in protecting the seal created by the first main seal tooth from rocking or flexing of the pipe about the first main seal tooth. A groove defined between the first main seal tooth and third inboard tooth allows a portion of the pipe located adjacent said groove to retain an original shape in order to enhance the tensile strength of the connection.

In another aspect of the invention, the first main seal tooth describes a twin tooth arrangement wherein two sealing teeth extend from a parent tooth, which arrangement allows the twin teeth to be smashed against the pipe in order to provide an improved seal against any irregular outer surface on the pipe while providing for enhanced tensile strength due to the substantially larger profile of the parent tooth.

BRIEF DESCRIPTION OF THE FIGURES

FIGS. 7A and 7B depict a schematical representation of portions of the coupling body of the invention.

DETAILED DESCRIPTION OF THE PREFERRED EMBODIMENT

Figure 1:
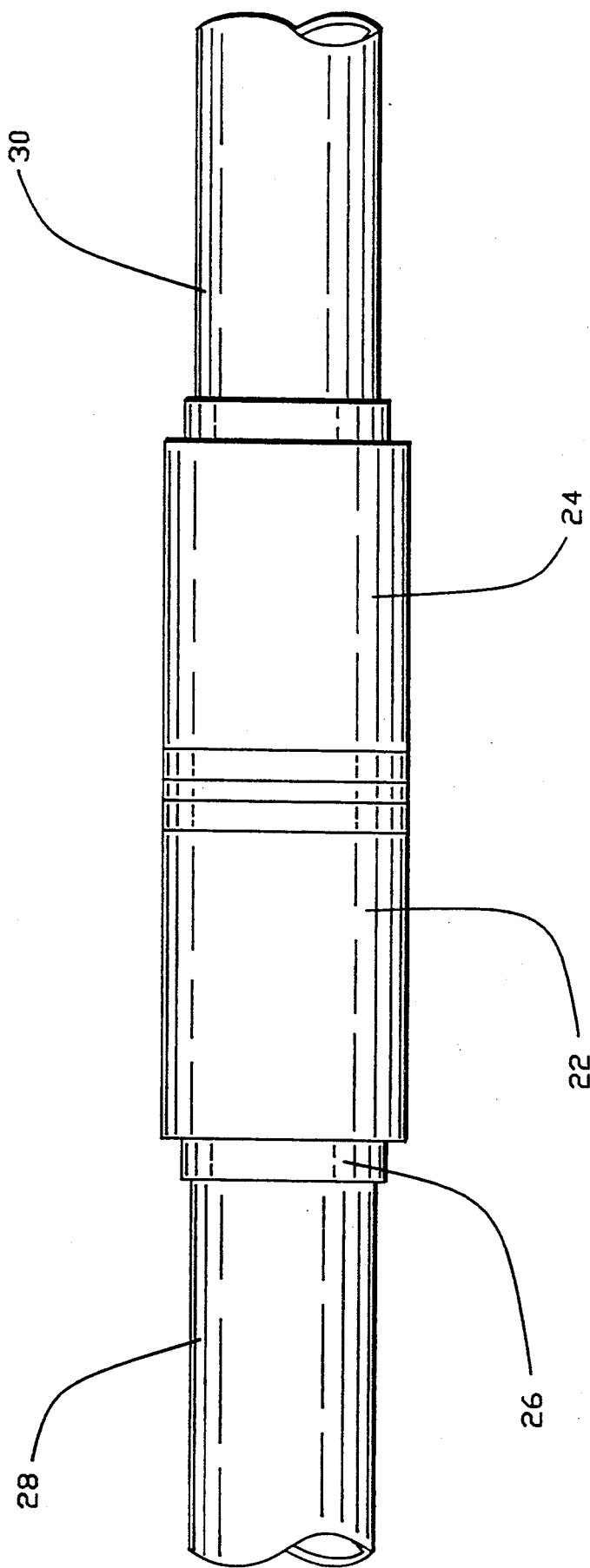
FIG. 1 depicts a plan view of an embodiment of the invention.

With respect to the figures and in particular to FIG. 1, an embodiment of the pipe fitting 20 of the invention is depicted. Pipe fitting 20 includes, in this particular embodiment, first and second swage rings 22, 24 which are urged over a coupling body 26 in order to secure together in a hermetically sealed manner first and second pipes 28, 30. It is noted that the pipe fittings of the invention can be used equally well with pipes, tubes and/or other conduits and that such pipes, tubes and/or other conduits shall be collectively referred to as pipes herein. Further, it is noted that while a preferred embodiment is discussed with respect to an arrangement wherein two pipes are joined together with a pipe fitting such as pipe fitting 20, other embodiments can include an arrangement wherein the pipe fitting is previously secured to a pipe in a conventional manner, such as by welding, such that only one swage ring, such as swage ring 24, is required to seal a separate pipe to the pipe fitting. Such arrangement can also include "T" joints, elbows and the like wherein one or more of the connections is accomplished in accordance with the invention and the other connections are accomplished conventionally by welding and the like.

Further, it is to be understood that the coupling body can be constructed of any malleable metal such as aluminum, steel, copper and the like whereas the swage rings are generally constructed of a metal of equal or higher strength. Further, the coupling body and swage rings can also be comprised of, by way of example only, plastic materials, polymers and composite materials having various fibers and filaments therein.

Figure 2:
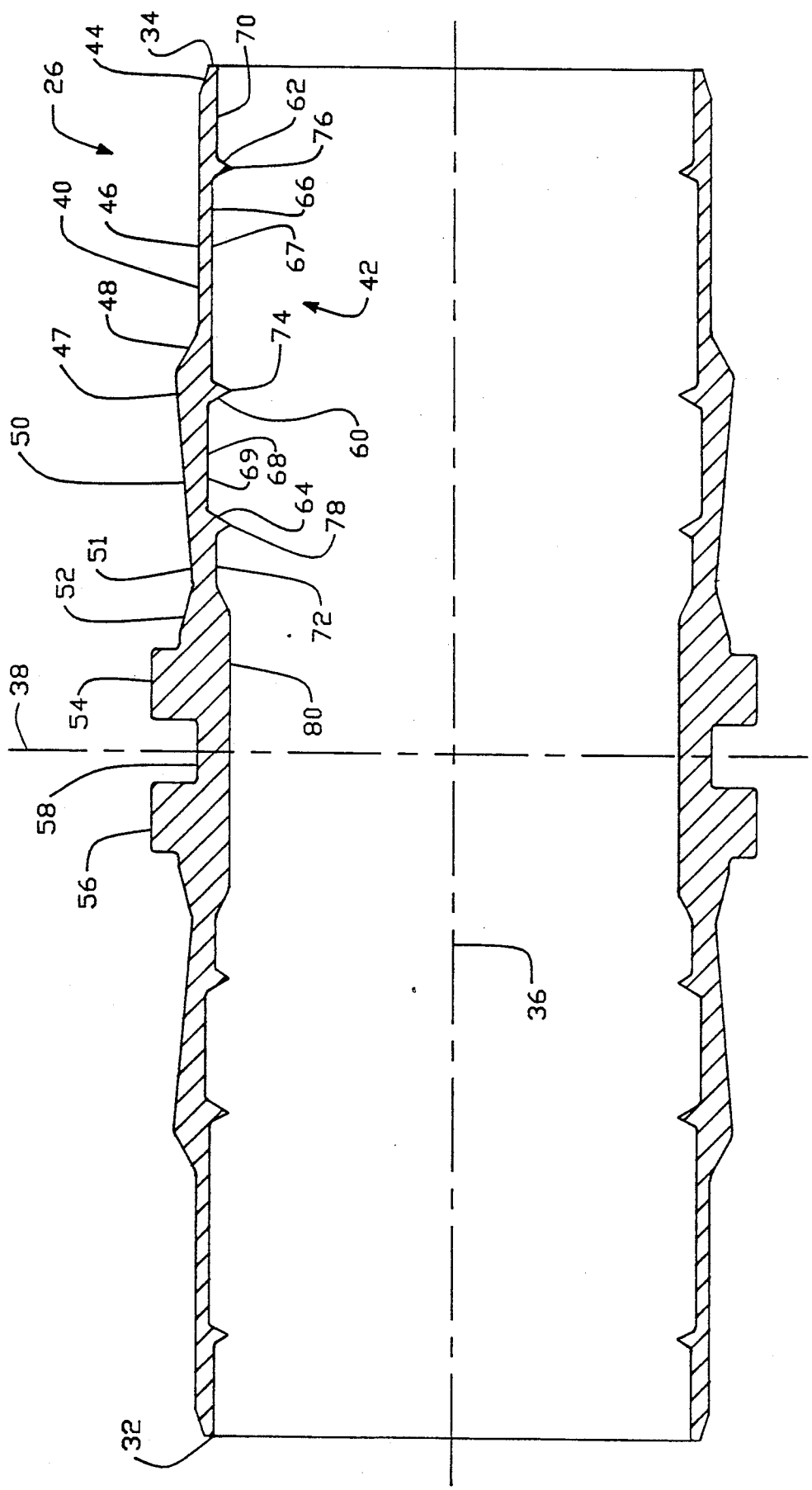
FIG. 2 depicts a partial cross-sectional view of a coupling body of an embodiment of the invention of FIG. 1 prior to the swage ring being urged over the coupling body.

The coupling body 26 of FIG. 2 is shown in a cross-sectional view taken through a diameter of the coupling body 26 prior to the swage rings 22, 24 being urged over the ends such as ends 32, 34, respectively. The swage rings 22, 24 cause deformation of the coupling body 26, such that the coupling body 26 bites into and secures the two pipes 28, 30 together. It can be seen that not only is the coupling body 26 symmetrical about cylindrical axis 36 but it is similarly symmetrical about radial axis 38. Thus, the following discussion concerning the portion of the coupling body 26 which lies above the cylindrical axis 36 and to the right of the radial axis 38, applies equally to all other similarly shaped portions of the coupling body.

As can be seen in FIG. 2, the coupling body 26 has an outer surface 40 and an inner surface 42. The outer surface 40 includes an initial outboard facing incline cylindrical surface 44 which facilitates the initial engagement of the swage ring 24 over the end 34 of the coupling body 26. Following the incline cylindrical surface 44 the coupling body defines a substantially flat cylindrical surface 46. Following the flat cylindrical surface 46, a substantial cylindrical ramp 48 is defined followed by a flat cylindrical surface or sealing rib 47 and a substantial inboard facing incline cylindrical surface which in the above identified patent and hereafter is referred to as reverse taper 50. Following the reverse taper 50, there is a short flat cylindrical surface 51 to facilitate manufacturing, and a further outboard facing incline cylindrical surface 52. Next to incline cylindrical surface 52, is an externally extending cylindrical stop flange 54 which stops the progress of the swage ring 24 as it is urged over the coupling body 26. It is noted that a similar cylindrical stop flange 56 stops the movement of the other swage ring 22 over the coupling body 26. The cylindrical stop flanges 54, 56 are separated by a cylindrical spacer flat 58.

The inner surface 42 of the coupling body 26 has in a preferred embodiment a plurality of teeth including main sealing tooth 60, an outboard isolation tooth 62 and an inboard tooth 64.

The main sealing tooth 60 and the outboard isolation tooth 62 define therebetween a first groove 66. The main sealing tooth 60 and the inboard tooth 64 define therebetween a second groove 68. Further, a pipe receiving groove 70 is defined outboard of the outboard isolation tooth 62 with an additional groove 72 defined inboard of the inboard tooth 64. The first and second grooves 66, 68 define groove bottom surfaces 67, 69, respectively. In a preferred embodiment, the lands 74, 76 and 78 of the teeth 60, 62, and 64, respectively, along with the internal cylindrical surface 80 which is located adjacent the stop flange 54 define a cylinder which is approximately the outer diameter of the pipe to be inserted into the coupling body 26.

As can be seen in FIG. 2, the main sealing tooth 60 is located adjacent to the sealing rib 47. The second tooth 62 is located adjacent the flat cylindrical surface 46 with the inboard tooth 64 located adjacent the lower portion of the reverse taper 50. As more fully described in the above incorporated patent, the reverse taper 50 assists in driving the main sealing tooth 60 into the pipe in order to secure the pipe within the coupling body 26.

It is to be understood that the reverse taper 50 can be replaced by another type of protrusion, such as, for example, an elevated land, in order to perform the function of assisting in driving the main sealing tooth into the pipe.

The design of the coupling body 26 is such that when the swage ring 24 is urged over the coupling body the main sealing tooth 60 is urged into substantial biting and sealing engagement with the outer surface of the pipe 30. This sealing is caused as the swage ring 24 is urged passed the reverse taper 50. The isolation tooth 62 is designed to make at least a minimal bite into the outer surface of the pipe 30, while the inboard tooth 64 is additionally designed to make at least a minimal bite into the outer surface of the pipe 30. However in the optimal design, the inboard tooth 64 bites into the pipe an amount less than the isolation tooth 62 with the isolation tooth 62 biting into the pipe an amount equal to or less than the amount that the main sealing tooth 60 bites into the pipe.

The purpose of the main sealing tooth 60 is to substantially engage the surface of the pipe in order to provide a hermetical seal so that no fluid flowing through the pipe can be released between the tooth and the pipe. The tooth 60 bites into the outer surface of the pipe, and simultaneously is somewhat smashed so as to fill any of the rough or irregular outside surface imperfections which are commonly found on the outside of the pipe. The tooth 60 is sufficiently wide and has a sufficient profile such that it resists tensile loading along the axis of the pipe which could occur should there be a force on the pipe which might tend to pull it out of the coupling body. Such tensile loading can, in part, be created by high burst pressures as would be loaded onto the coupling by the fluid inside the pipe.

The first and second grooves 66, 68 located on opposite side of the main sealing tooth 60 are designed with a length and a depth such as that the portion of the pipe located adjacent such grooves is not substantially deformed as the swage ring is urged over the coupling body. If the pipe is in fact deformed, the grooves 66, 68 are of sufficient length and depth so that pipes can spring back to substantially their original shape after the swage ring has been fully seated over the coupling body. Such an arrangement is advantageous as it increases the tensile strength of the fitting due to the fact that the entire original diameter of the pipe must be overcome, as it interferes with the entire length of the tooth, before the pipe can be forced out of the coupling body due to tensile loading resulting from burst pressure or other forces. Further, as the portions of the pipe on either side of the main sealing tooth 60 are not substantially deformed by the coupling body, the portion of the pipe adjacent the main sealing tooth is not substantially deformed and simultaneously urged away from the main sealing tooth 60 at the very time when the swage ring 24 is compressing the reverse taper 50 in order to urge the main sealing tooth 60 toward the pipe. Thus the present design allows the main sealing tooth 60 to be used to maximum advantage to provide a seal without the coupling body itself forcing the pipe away from the tooth 60.

The outboard isolation tooth 62 as well as the inboard tooth 64 prevent the pivoting or rocking of the pipe about a fulcrum established where the main sealing tooth 60 bites into the pipe. Accordingly, the pipe is prevented from bending or flexing about the main sealing tooth 60, thus preventing relative motion between main sealing tooth 60 and the pipe and thus leakage at the point where the main sealing tooth engages the pipe 30. Such relative motion between main sealing tooth 60 and the pipe can cause the tooth 60 to plastically deform and wear resulting in the seal being compromised with resultant leakage. It is to be understood that for purposes of preventing such bending or rocking, that the outboard isolation tooth 62 is of most importance and that the inboard tooth 64 can in some embodiments, for purposes of economy, be dispensed with.

Such a design has a particular advantage with respect to thin walled pipes as the pipe is not collapsed away from the main sealing tooth 60 due to the contacting of the pipe caused by the first and second grooves on either side of the main sealing tooth and thus the main sealing tooth can more substantially bite into the thin walled pipe. Further, the arrangement increases the tensile loading which can be placed on the pipe fitting, as again the pipe on the sides of the main sealing tooth maintains its substantial original diameter and thus maintains substantial interference between the original outside diameter of the pipe and the depth of the main sealing tooth 60.

Figure 3:
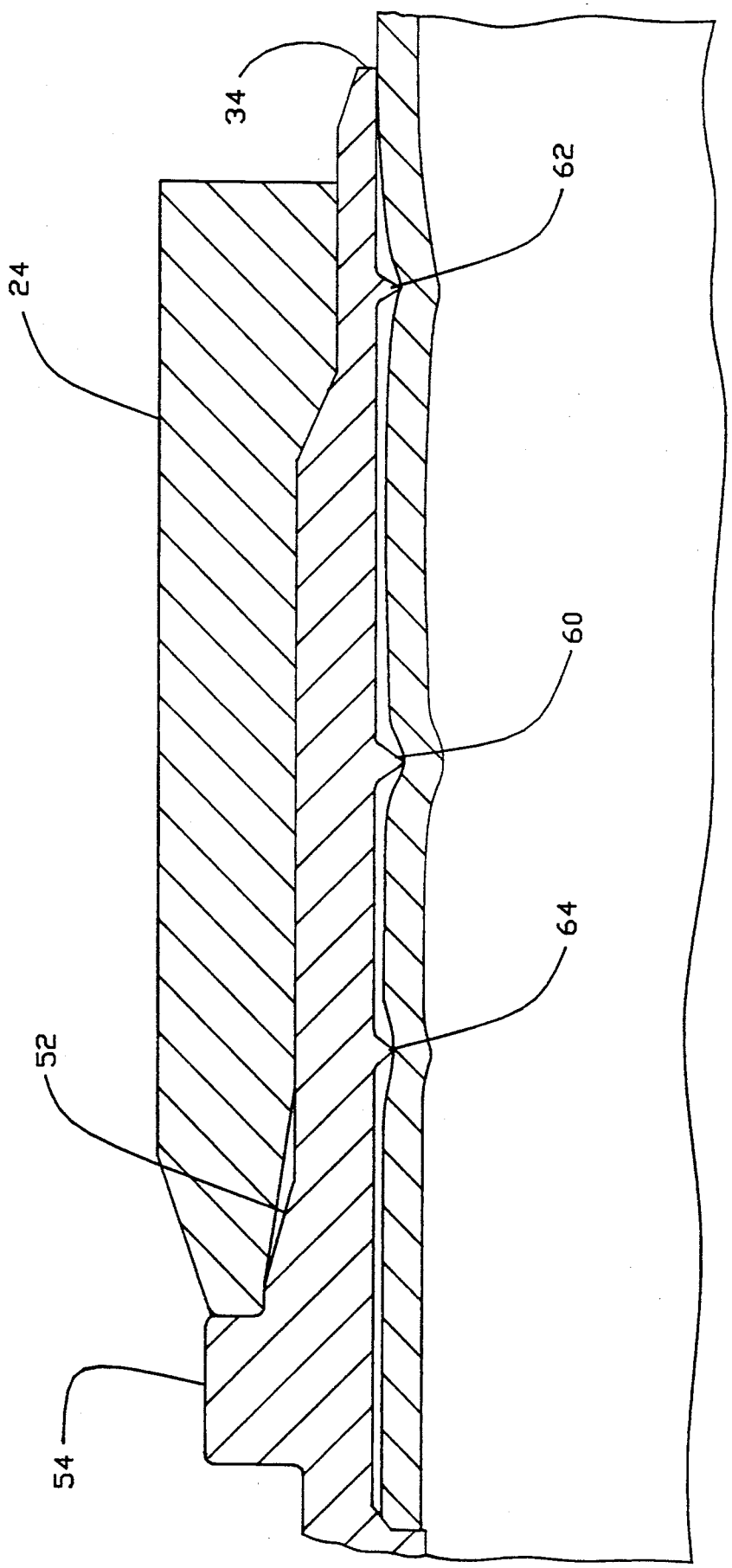
FIG. 3 depicts a partial cross-sectional view of the embodiment of FIG. 1 with the tooth arrangement deformed against a pipe.

FIG. 3 demonstrates a cross-sectional view taken from the portion of FIG. 2 which has been previously described showing the swage ring 24 in place over the coupling body 26 with the main sealing tooth 60, the outboard isolation tooth 62, and the inboard tooth 64 engaging the pipe 30.

Figure 4:
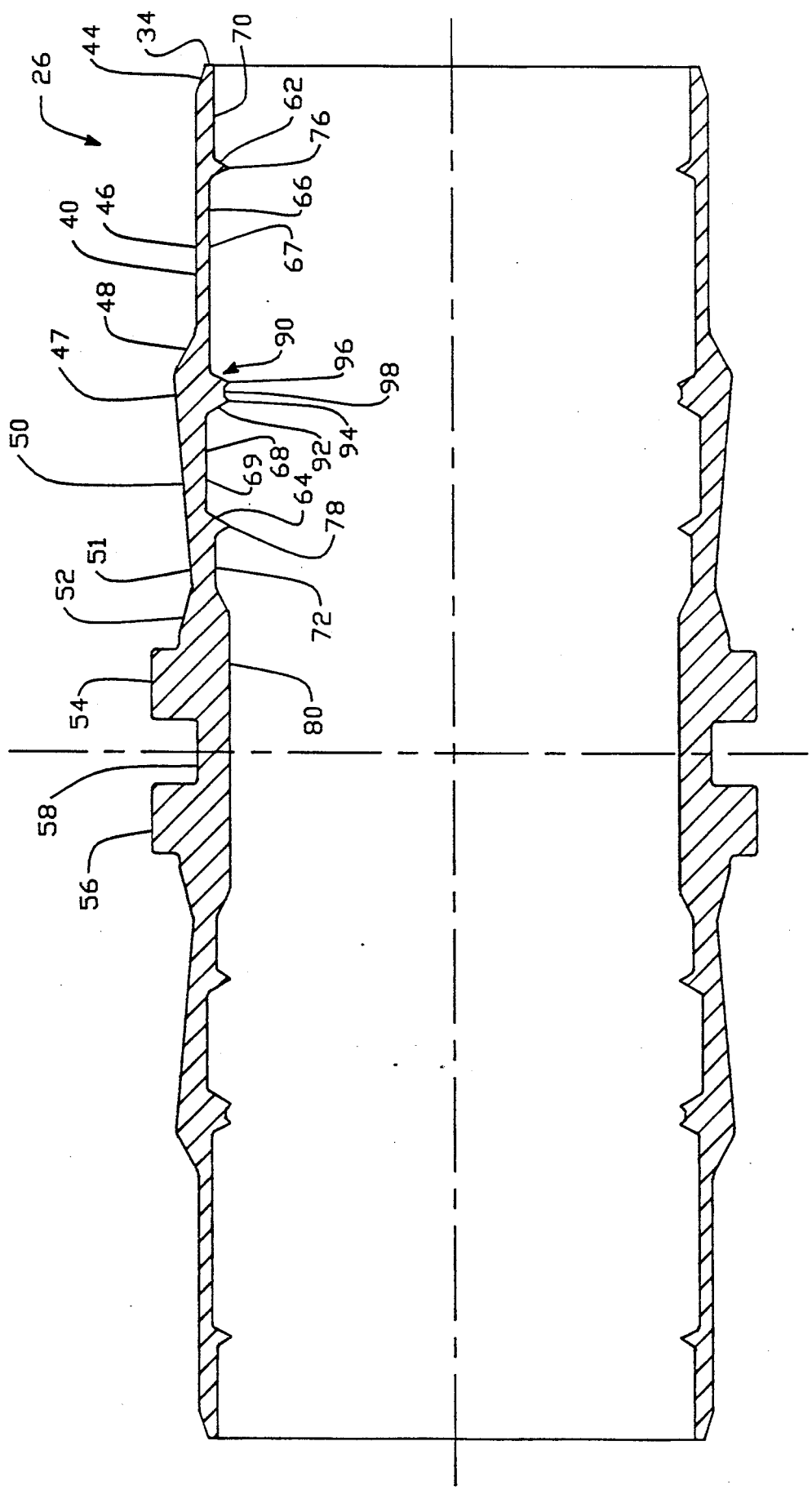
FIG. 4 depicts another coupling body of an embodiment of the invention having a twin tooth arrangement prior to a swage ring being urged over the coupling body.
Figure 5:
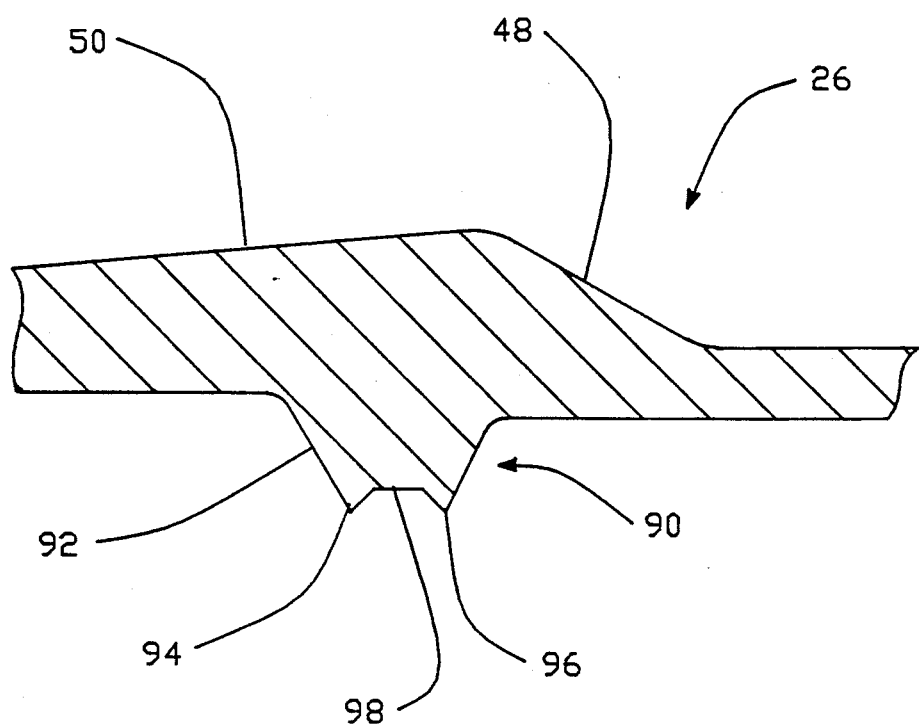
FIG. 5 depicts an enlargement of the twin tooth arrangement of FIG. 4.
Figure 6:
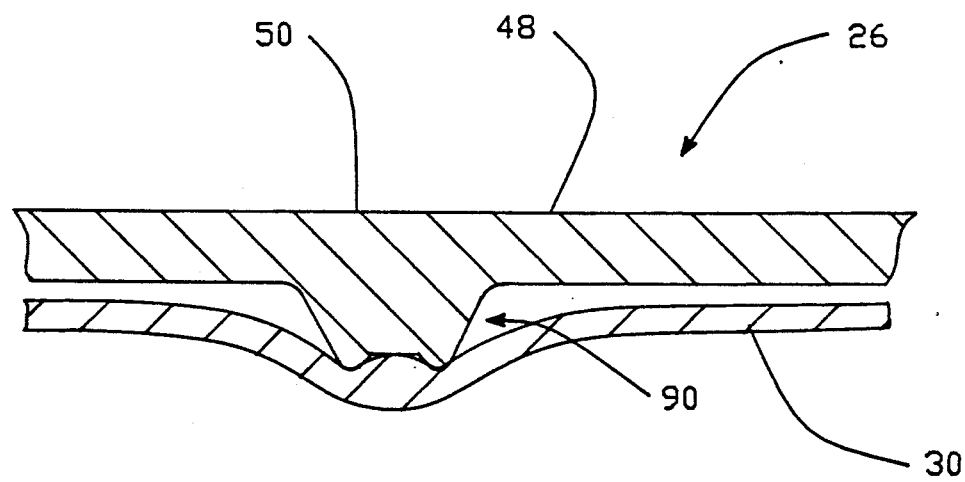
FIG. 6 depicts an enlargement of a twin tooth arrangement deformed against a pipe.

An alternate embodiment of the main sealing tooth 60 is depicted in FIGS. 4, 5 and 6. In this embodiment, the main sealing tooth 60 is replaced with a twin tooth 90. The twin tooth 90 includes a parent tooth 92 and extending therefrom a first sealing tooth 94 and a second sealing tooth 96. A groove 98 is defined between the first sealing tooth 94 and the second sealing tooth 96. In this embodiment, the width of the parent tooth 92 is larger than the width of the main sealing tooth 60 of the prior embodiment while the width of the first sealing tooth 98 and the width of the second sealing tooth are smaller than the width of the main sealing tooth 60. The first sealing tooth 94 and the second sealing tooth 96 have knife-edges. The two sealing teeth 94, 96 bite into the outside surface of the pipe and at the same time mushroom and smash themselves to fill up crevices, cracks and other surface imperfections on the outside of the pipe. The wide parent tooth 92 provides tensile shear strength once the two sealing teeth 94, 96 have been smashed and also provides high compressive strength to deform the outer surface of a thick walled pipe. The twin tooth design also provides for good hermetic sealing for thin walled pipes as the sealing teeth 94, 96 bite into the thin walled pipe without the parent tooth simply deforming the pipe and this design can also withstand the tensile shearing loads required of teeth used with thick walled pipes. It is to be understood that an alternative embodiment of the invention can have only one sealing tooth mounted on the parent tooth.

FIG. 6 shows a cross-sectional view of the twin tooth 90 after a swage ring has been urged over the coupling body urging the twin tooth into sealing engagement with the pipe.

Equations describing the preferred embodiment of the present invention have been derived by fitting curves to empirically derive coupling body dimensions. FIG. 7A depicts a portion of the coupling body of FIG. 2 and identifies the dimensions which are described by the below formula.

It is to be understood that for each dimension described by the formulas, first a general formula is given with ranges for the constant values. These ranges for the constant values produce preferred minimum to maximum values of the dimensions for a preferred embodiment made of any material. Also for each dimension there is a formula with specific constant values which describe a preferred embodiment for stainless steel and/or a copper-nickel material, as specified. Further, it is to be understood that dimensions other than those prescribed by the formulas can be successfully used to practice the invention and fall within the spirit and scope of the invention as claimed. The below formula use input values in inches and give results in inches. These formulas can be used with other measuring units by changing the constant values. Further, the formulas are described with respect to nominal dimensions without consideration being given to tolerances.

Length of One End of the Coupling Body (A)

General Formula

The length of substantially one end of the coupling body as designated by the letter A in FIG. 7A for all materials is described by the formula:

$$A = K1 + K2 \text{ (actual pipe outside diameter)}$$

where
$K1 = 0.01$ to $0.5$
$K2 = 0.2$ to $1.75$

Specific Formula

The length of substantially one end of the coupling body as designated by the letter A in FIG. 7A for stainless steel is described by the formula:

$$A = 0.534 \text{ (10) exp.[0.265 (actual pipe outside diameter)]}$$

where exp. means raised to the power of.

For copper nickel material the length A has been empirically derived to be:

$$A = 0.314 + 0.77 \text{ (actual pipe outside diameter)}$$

The length of the body A relates to the amount of bending that the coupling body can resist. Thus, for an optimal length, A should not be too short otherwise there may be failure due to flexing. Such flexing causes relative motion to occur between the main sealing tooth and the pipe resulting in leakage. Further, if the lengths were too short, the below specified grooves between the various teeth would not be able to fit within the coupling body.

Groove Depth for the Main Sealing Tooth (D)

General Formula

For all materials, the empirically derived formula for the grooved depth of the main seal tooth as designated by the letter D if FIG. 7A is given by the formula:

$$D = \text{(Theoretical pipe deformation at the location of the main sealing tooth/2)} + K3 \text{ (actual pipe outside diameter/}T\text{) exp. } K4$$

where
$T = $(maximum wall thickness + minimum wall thickness of a pipe)/2
and where $K3 = 0.0001$ to $0.05$
$K4 = 0.05$ to $0.5$.

Specific Formula

For stainless steel or copper nickel or other material, the empirically derived formula for the grooved depth of the main seal tooth as designated by the letter D in FIG. 7A is given by the formula:

$$D = \text{(theoretical pipe deformation at the location of the main sealing tooth/2)} + 0.006 \text{ (actual pipe outside diameter/}T\text{) exp. } 0.245$$

where $T = $(maximum wall thickness + minimum wall thickness of a pipe)/2

In the above formulas, the theoretical pipe deformation at the sealing tooth 60 is an empirically derived number based on the amount of deformation desired given the type of pipe and the tensile loading involved. By way of example only, for a pipe having an actual outside diameter of one inch, it may be desired that there by a theoretical deformation of about 1% to 7%, depending on the materials used, the wall thicknesses, and the pipe tolerance. The formula indicates that the length of the main seal tooth is proportionate to the amount of deformation desired. Thus, if more deformation is desired for the particular embodiment, the formula will call for a longer main seal tooth and thus a larger groove depth D.

Groove Depth Isolation Tooth (E)

General Formula

The groove depth E for the isolation tooth 62 as identified in FIG. 7A for all materials is defined as follows:

$$E = \text{(theoretical pipe deformation caused by the isolation tooth/2)} + K5 + K6 \text{ (actual pipe outside diameter)}/T$$

where
$T = $(maximum wall thickness * minimum wall thickness)/2
and where $K5 = -0.01$ to $0.04$ $K6 = 0.00005$ to $0.04$

Specific Formula

The groove depth E for the isolation tooth 62 as identified in FIG. 7A for stainless steel or copper nickel or other material is defined as follows:

$$E = \text{(theoretical pipe deformation caused by the isolation tooth/2)} + 0.00521 + 0.000419 \text{ (actual pipe outside diameter)}/T$$

where T = (maximum wall thickness + minimum wall thickness)/2

For purposes of this equation, the theoretical pipe deformation at the isolation tooth 62 is derived in much the same manner as the theoretical pipe deformation for the main seal tooth is derived for the above equation with respect to the groove depth of the main seal tooth. In a preferred embodiment and by way of example only, with the pipe deformation at the main sealing tooth 60 being 1% to 7%, the theoretical deformation at the isolation tooth 62 can be, for example, 0% to 5%. By way of example, the theoretical pipe deformation at the inboard tooth 64 would then be less than 3% and in a preferred embodiment is between 0% and 3%.

Groove Width Between Main Seal Tooth and Isolation Tooth (C)

General Formula

For all materials, the groove width between the main seal tooth 60 and the isolation tooth 62 is described by the formula:

$$C = K7 + K8 \text{ (actual pipe outside diameter)}/T$$

here
T = is defined hereinabove
and $K7 = -0.2$ to $0.15$
$K8 = 0.0001$ to $0.06$

Specific Formula

For both stainless steel and copper nickel material and other materials, the groove width between the main seal tooth 60 and the isolation tooth 62 is described by the formula:

$$C = 0.006 + 0.024650 \text{ (actual pipe outside diameter)}/T$$

here T = is defined hereinabove.

Distance to Start Main Seal Tooth (B)

General Formula

The distance from the end of the coupling body to the beginning of the main sealing tooth is defined by the letter B in FIG. 7A and described for all materials as follows:

$$B = K9(A) - K10$$

where
$K9 = 0.4$ to $0.9$
$K10 = -0.1$ to $0.5$

Specific Formula

The distance from the end of the coupling body to the beginning of the main sealing tooth is defined by the letter B in FIG. 7A and described for stainless steel and copier nickel as follows:

$$B = 0.635(A) - 0.129$$

Land Between Grooves (F)

The land between the grooves which is the flat area of each of the teeth as shown in FIG. 7A, is as follows:

F = 0.008 inches if the outside diameter of the pipe is less than 1.315 inches; and F = 0.008 + 0.0015 (actual pipe outside diameter) if the outside diameter of the pipe is equal to or greater than 1.315 inches This formula indicates that for larger diameter pipes, a larger tooth land is required in order to meet the tensile loading placed on the tooth by the pipe.

Distance to the Start of the Inboard Tooth (G)

General Formula

The distance to the start of the inboard tooth for all materials is as follows:

$$G = \text{distance to the start of reverse taper (designated as 0)} = \{[(\text{the outside diameter of the coupling body at the beginning of the inverse taper (designated as } R) - \text{the outside diameter of the coupling body at a zero deformation location (designated as } S))/2]/\text{TANGENT (reverse taper angle } M^\circ)\} + K11 \text{ (land between the grooves (designated as } F))$$

where
$K11 = 0.5$ to $3$
where O = the distance to the start of the reverse taper;
R = the outside diameter of the coupling body at the beginning of the reverse taper;
S = the outside diameter of the coupling body at a point of zero deformation with the swage ring driven over the coupling body; and
M = the angle of the reverse taper.

Specific Formula

The distance to the start of the inboard tooth for stainless steel and copper nickel is as follows:

$$G = \text{distance to the start of reverse taper (designated as } O) + \{[(\text{the outside diameter of the coupling body at the beginning of the inverse taper (designated as } R) - \text{the outside diameter of the coupling body at a zero deformation location (designated as } S))/2]/\text{TANGENT (reverse taper angle } M^\circ)\} + 1.9 \text{ (land between the grooves (designated as } F))$$

Where:
O = the distance to the start of the reverse taper;
R = the outside diameter of the coupling body at the beginning of the reverse taper;
S = the outside diameter of the coupling body at a point of zero deformation with the swage ring driven over the coupling body; and
M = the angle of the reverse taper.

It is noted that the rationale for the distance to the start of the inboard tooth is to have an inboard tooth just touching and supporting the pipe outside diameter at a minimum tolerance condition. At minimum tolerance there is no biting of the inboard tooth into the pipe. The outside diameter of the coupling body at zero deformation is determined theoretically from a dimensional analysis or tolerance study assuming no biting of the tooth into the pipe at a minimum tolerance condition.

Inboard Tooth Groove Depth (H)

General Formula

The inboard tooth groove depth identified by the letter H in FIG. 7A is specified for all materials as follows:

$H$ = [(outside diameter of the critical section (identified by $N$)) − {2 (calculated wall thickness at critical section) + (internal diameter of the coupling body)}]/2
or:
$K12$ (groove depth of isolation tooth ($E$)) whichever tube is smaller.

where $K12 = 0.1$ to 1.

Specific Formula

The inboard tooth groove depth identified by the letter H in FIG. 7A is specified as follows:

$H$ = [(outside diameter of the critical section (identified by $N$)) − {2 (calculated wall thickness at critical section) + (internal diameter of the coupling body)}]/2
or:
0.6 (groove depth of isolation tooth ($E$)) whichever tube is smaller.

For this formula, it is noted that the outside diameter of the critical section is indicated by the letter N and that the thickness at the critical section is calculated to be a minimum wall thickness capable of withstanding the desired burst pressure. The wall thickness at the critical section is important as it is theoretically the weakest point of the coupling body.

With respect to the twin teeth and referring to FIG. 7B, the equations which describe the dimensions of the twin teeth for the above specified material are as follows:

The Width of the Parent Tooth (I)

General Formula

The width of the parent tooth which is designated by the letter I is, for all materials, as follows:

$I$ = $C1$ [{(pipe outside diameter) (the calculated burst pressure of the pipe)}/$C2$(ultimate tensile strength of the coupling body material)]

where
$C1 = 0.2$ to 1.2
$C2 = 2$ to 6

Specific Formula

The width of the parent tooth which is designated by the letter I is for stainless steel and copper nickel as follows:

$I$ = 0.6 [{(pipe outside diameter) (the calculated burst pressure of the pipe)}/4(ultimate tensile strength of the coupling body material)]

It is noted that the width is calculated based on the burst pressure required so that the tooth can withstand the tensile shear forces placed upon it. The parent tooth is also designed to support the small sealing teeth under expected compression forces.

The Width of the Small Sealing Teeth (J)

General Formula

The width of the small sealing teeth is indicated by the letter J and is designated for all materials as follows:

$J = C3$ (width of the parent tooth)

where $C3 = 0.01$ to 0.5

Specific Formula

The width of the small sealing teeth is indicated by the letter J and is designated for stainless steel and copper nickel as follows:

$J = 0.15$ (width of the parent tooth).

Groove Depth of the Small Sealing Teeth (K)

General Formula

The groove depth of the small sealing teeth designated by the letter K is, for all materials, as follows:

$K = C4$ (actual pipe outside diameter/$T$) exp. $C5$ where
$C4 = 0.001$ to 0.005
$C5 = 0.1$ to 0.5

Specific Formula

The groove depth of the small sealing teeth designated by the letter K, for stainless steel and copper nickel, is as follows:

$K = 0.003$ (actual pipe outside diameter/$T$) exp. 0.251

Groove Ramp Angle (X)

General Formula

The groove ramp angle as shown in FIG. 7B, in a preferred embodiment for all materials, is defined by the formula:

Groove Ramp angle = $C6°$ where $C6 = 40°$ to 90°

Specific Formula

The groove ramp angle as shown in FIG. 7B is equal to, in a preferred embodiment 60° for stainless steel and copper nickel. This angle was selected to afford good resistance to shear loading and to provide for appropriate biting of the sealing teeth, which extend from the parent tooth, into the pipe.

Industrial Applicability

The present invention is designed to successfully bring together two pipe ends or tubes and meet burst pressure and shear loading required. In operation, the pipes are fit into opposite ends of the coupling body. After this has been accomplished, the swage rings are forced over the coupling body in order to compress the reverse taper and the coupling body, forcing the teeth to bite into the pipes creating the hermetic seal that is resistant to tensile loads and bending. An appropriate hydraulic tool for causing the swage rings to be driven over the coupling body is disclosed in U.S. Pat. No. 4,189,817, issued Feb. 26, 1980 and entitled "HYDRAULIC ASSEMBLY TOOL FOR TUBE FITTINGS" which is licensed to the assignee of this invention and which is incorporated herein by reference.

Other objects and advantages of the present invention can be obtained from a review of the figures and the appended claims.

It is to be understood that other embodiments of the present invention can be constructed which fall within the spirit and scope of the appended claims.

We claim:

1. An apparatus for making pipe connections comprising:
   a coupling body with a first surface adapted for receiving a pipe, which pipe has an initial shape;
   a swage ring means which is adapted for being urgeable relative to the pipe in order to cause at least part of the first surface to engage the pipe to create a seal;
   said first surface of the coupling body describing a first tooth means for substantial biting into the pipe as said swage ring means is urged relative to the pipe;
   said first surface describing a second tooth means for making at least a minimal bite into the pipe as said swage ring means is urged relative to the pipe;
   a groove defined between the first tooth means and the second tooth means;
   said groove defining a length between the first tooth means and the second tooth means;
   said groove having a bottom and defining a depth which represents a distance that the first tooth means extend from the bottom;
   wherein the length and depth of the groove are selected so that a portion of the pipe located between the first tooth means and the second tooth means substantially retains an initial shape after the swage ring means has caused the first tooth means and the second tooth means to bite into the pipe;
   said first surface describing a third tooth means for making at least a minimal bite into the pipe as said swage ring means is urged relative to the pipe, said third tooth means located on the opposite side of the first tooth means from the second tooth means;
   a second groove defined between the first tooth means and the third tooth means;
   said second groove defining a second length between the first tooth means and the third tooth means;
   said second groove having a second bottom and defining a second depth which represents a second distance that the first tooth means extend from the second bottom;
   wherein the second length and the second depth of the second grooves are selected so that a second portion of the pipe located between the first tooth means and the third tooth means substantially retain an initial shape after the swage ring means has caused the first tooth means and the third tooth means to bite into the pipe;
   wherein the coupling body defines a pipe receiving end and wherein said third tooth means is located more distantly from the pipe receiving end than the first tooth means;
   said first surface is an inner surface and said coupling body having an outer surface defining a reverse taper means for assisting the swage ring in urging the first tooth means to bite into the pipe, which reverse taper means protrudes a greater distance from the outer surface substantially adjacent to the first tooth means and slopes downwardly to a position substantially adjacent to the third tooth means.

2. The apparatus of claim 1 wherein said second tooth means is located closer to the pipe receiving end than the first tooth means, wherein the length of the groove is sufficient to enable the second tooth means to prevent the pipe from bending and relative motion between the pipe and the first tooth means.

3. The apparatus of claim 1 wherein:
   said second tooth means is located closer to the pipe receiving end than the first tooth means; and
   wherein the length of the groove in inches is about:

$K7 + K8$ (actual pipe outside diameter/T)

where
   $T =$ (maximum pipe wall thickness + minimum pipe wall thickness)/2
   where: $K7$ is in the range of about $-0.2$ to $0.15$
   $K8$ is in the range of about $0.0001$ to $0.06$.

4. The apparatus of claim 1 wherein said second tooth means is located closer to the pipe receiving end than the first tooth means; and
   wherein the depth of the groove in inches is about:

(theoretical pipe deformation at second tooth means)/2 + $K5$ + $K6$ (actual pipe outside diameter/T)

where:
   $T =$ (maximum pipe wall thickness + minimum pipe wall thickness)/2
   where: $K5$ is in the range of about $-0.01$ to $0.01$
   $K6$ is in the range of about $0.00005$ to $0.04$ and
   wherein theoretical pipe deformation at the second tooth means is the theoretical amount the pipe is deformed where the second tooth means bites into the pipe.

5. The apparatus of claim 1 wherein said second tooth means is located closer to the pipe receiving end than the first tooth means; and
   wherein the depth of the second groove in inches is about:

(theoretical pipe deformation at the first tooth means)/2 + $K3$ (actual pipe outside diameter/T) exp. $K4$ wherein:
   $K3$ is in the range of about $0.0001$ to $0.05$
   $R4$ is in the range of about $0.05$ to $0.5$
   where the theoretical pipe deformation at the first tooth means is the theoretical amount the pipe is deformed where the first tooth means bites into the pipe.

6. The apparatus of claim 1 wherein said second tooth means is located closer to the pipe receiving end than the first tooth means;
   wherein the length of the second groove is about the difference between (1) the distance from the pipe receiving end and the third tooth means and (2) the distance between the pipe receiving end and the first tooth means; wherein:
   (1) the distance between the pipe receiving end and the third tooth means in inches is about:

distance to the start of the reverse taper + {[(outside diameter of the coupling body at the first tooth means − outside diameter of coupling body at zero deformation)/2]/Tangent (reverse taper angly)} + $K11$ (land of the first tooth means)

where:
$K11$ is in the range of about 0.5 to 3 wherein the land with the first tooth means is
(a) 0.008 inches if the pipe actual outside diameter <1.315 includes; and is
(b) 0.008 inches +(0.0015) (pipe actual outside diameter)
if the pipe actual outside diameter 1.315 inches and wherein:
(2) the distance between the pipe receiving end and the first tooth means in inches about:

$K9$ (length of coupling body over which the swage ring transverse)−$K10$ where:
$K9$ is in the range of about 0.4 to 0.9
$K10$ is in the range of about −0.1 to 0.5.

7. The apparatus of claim 6 wherein the length of the coupling body over which the swage ring means transverse in inches is about:

$K1+K2$ (actual pipe outside diameter)

where:
$K1$ is in the range of about 0.01 to 0.5
$K2$ is in the range about 0.2 to 1.75.

8. The apparatus of claim 1
wherein said second groove has a greater depth than the depth of the groove; and
wherein said length of said groove is greater than the length of said second groove.

9. An apparatus for making pipe connections comprising:
a coupling body with a first surface adapted for receiving a pipe;
a swage ring means adapted for being urgeable relative to the pipe in order to cause at least part of the first surface to engage the pipe to create a seal;
said first surface of the coupling body describing a first tooth means for making a substantial biting into the pipe as said swage ring means is urged relative to the pipe;
said first surface describing a second tooth means for making at least a minimal bite into the pipe as said swage ring means is urged relative to the pipe;
a groove defined between the first tooth means and the second tooth means;
said groove defining a length between the first tooth means and the second tooth means;
said groove having a bottom and defining a depth which represents a distance that the first tooth means and the second tooth means extend from the bottom;
wherein the length and depth of the groove are selected so that should a portion of the pipe located between the first tooth means and the second tooth means come into contact with the bottom of the recess, the pipe will not be substantially pushed away from the first tooth means and the second tooth means so as not to substantially affect the biting engagement of the first tooth means with the pipe and the biting engagement of the second tooth means with the pipe;
said first surface describes a third tooth means for making at least a minimal bite into the pipe as said swage ring means is urged relative to the pipe, said third tooth means located on the opposite side of the first tooth means from the second tooth means;
a second groove defined between the first tooth means and the third tooth means;
said second groove defining a second length between the first tooth means and the third tooth means;
said second groove having a second bottom and defining a second depth which represents a second distance that the first tooth means and the third tooth means extend from the second bottom;
wherein the second length and the second depth of the second grooves are selected so that should a second portion of the pipe located between the first tooth means and the third tooth means come into contact with the second bottom of the second recess, the pipe will not be substantially pushed away from the third tooth means and the first tooth means so as not to substantially affect the biting engagement of the third tooth means with the pipe and the biting engagement of the first tooth means with the pipe;
wherein the coupling body defines a pipe receiving end and wherein said third tooth means is located more distantly from the pipe receiving end than the first tooth defining means; and
said first surface is an inner surface and said coupling body having an outer surface defining a reverse taper means for assisting the swage ring means in urging the first tooth means into biting engagement with the pipe, which reverse taper means protrudes a greater distance from the outer surface substantially adjacent to the first tooth means and slopes downwardly to a position substantially adjacent to the third tooth means.

10. The apparatus of claim 9 wherein said second tooth means is located closer to the pipe receiving end than the first tooth means, wherein the length of the groove is sufficient to enable the second tooth means to prevent the pipe from bending and prevent relative motion between the pipe and the first tooth means.

11. An apparatus for making pipe connections comprising:
a coupling body with a first surface adapted for receiving a pipe;
a swage ring means adapted for being urgeable relative to the pipe in order to cause at least part of the first surface to engage the pipe to create a seal;
said first surface of the coupling body describing a first main seal tooth means for making a substantial biting into the pipe as said swage ring means is urged relative to the pipe;
said first surface describing a second isolation tooth means for making at least a minimal bite into the pipe as said swage ring means is urged relative to the pipe, said second isolation tooth means spaced from and on one side of the first main seal tooth means;
said first surface describing a third inboard tooth means for making at least a minimal bite into the pipe as said swage ring means is urged relative to pipe, said third inboard tooth means spaced from and on the opposite side of the first main seal tooth means from the second isolation tooth means;

a first groove defined between the first main seal tooth means and the second isolation tooth means;

said first groove defining a length between the first main seal tooth means and the second isolation tooth means;

said first groove having a first bottom and defining a first depth which represents a distance that the first main seal tooth means and the second isolation tooth means extend from the bottom;

a second groove defined between the first main seal tooth means and the third inboard tooth means;

said second groove defining a second length between the first main seal tooth means and the third inboard tooth means;

said second groove having a second depth which represents a second distance that the first main seal tooth means and the third inboard tooth means extend from the second bottom;

wherein the first and second lengths and the first and second depths of the first and second grooves are selected so that should a first portion of the pipe located between the first main seal tooth means and the second isolation tooth means and should a second portion of the pipe located between the first main seal tooth means and the third inboard tooth means come into contact with the first and second bottoms respectively, the pipe will not be substantially pushed away from the first main seal tooth means, the second isolation tooth means and the third inboard tooth means so as to substantially reduce the biting engagement of the first main seal tooth means, the second isolation tooth means and the third inboard tooth means into the pipe;

wherein the coupling body defines a pipe receiving end and wherein said third tooth means is located more distantly from the pipe receiving end than the first main seal tooth defining means; and said first surface is an inner surface and said coupling body having an outer surface defining a reverse taper means for assisting the swage ring means in urging the first main seal tooth means into biting engagement with the pipe, which reverse taper means protrudes a greater distance from the outer surface substantially adjacent to the first main seal tooth means and slopes downwardly to a position substantially adjacent to the third inboard tooth means.

12. The apparatus of claim 11 wherein said second isolation tooth means is located closer to the pipe receiving end than the first main seal tooth means, wherein the length of the groove is sufficient to enable the second isolation tooth means to prevent the pipe from bending and prevent relative motion between the pipe and the first main seal tooth means.

13. An apparatus for making pipe connections comprising:

a coupling body with a first surface adapted for receiving a pipe;

a swage ring means adapted for being urgeable relative to the pipe in order to cause at least part of the first surface to engage the pipe to create a seal;

said first surface of the coupling body describing tooth means for substantial biting engagement with the pipe as said swage ring means is urged relative to the pipe;

said tooth means includes:

a parent tooth;

a first sealing tooth extending from the parent tooth for biting engagement with the pipe;

a second sealing tooth extending from the parent tooth for biting engagement with the pipe;

a groove located between the first sealing tooth and the second sealing tooth.

14. The apparatus of claim 13 wherein said parent tooth is substantially larger than either of the first sealing tooth or the second sealing tooth so that the parent tooth enhances the tensile strength of the tooth means, and the first sealing tooth and the second sealing tooth allow the tooth means to conform in sealing engagement with a pipe having an irregular outer surface.

15. An apparatus for making pipe connections comprising:

a coupling body with a first surface adapted for receiving a pipe and an outer surface;

a swage ring means adapted for being urgeable relative to the pipe in order to cause at least part of the first surface to engage the pipe to create a seal;

said first surface of the coupling body describing a tooth means for substantial biting into the pipe as said swage ring means is urged relative to the pipe; and wherein said tooth means includes a parent tooth from which extends a sealing tooth.

16. The apparatus of claim 15 wherein a second sealing tooth extends from the parent tooth.

17. The apparatus of claim 15 wherein said parent tooth is substantially larger than the sealing tooth so that the parent tooth enhances the tensile strength of the tooth means, and the sealing tooth allows the tooth means to conform in sealing engagement with a pipe having an irregular outer surface.

18. An apparatus for making pipe connections comprising:

a coupling body with a first surface adapted for receiving a pipe, which pipe has an initial shape;

a swage ring means which is adapted for being urgeable relative to the pipe in order to cause at least part of the first surface to engage the pipe to create a seal;

said first surface of the coupling body describing a first tooth means for substantial biting into the pipe as said swage ring means is urged relative to the pipe;

said first surface describing a second tooth means for making at least a minimal bite into the pipe as said swage ring means is urged relative to the pipe;

a groove defined between the first tooth means and the second tooth means;

said groove defining a length between the first tooth means and the second tooth means;

said groove having a bottom and defining a depth which represents a distance that the first tooth means extend from the bottom;

wherein the length and depth of the groove are selected so that a portion of the pipe located between the first tooth means and the second tooth means substantially retains an initial shape after the swage ring means has caused the first tooth means and the second tooth means to bite into the pipe; and wherein said first tooth means includes a parent tooth from which extends a first sealing tooth and a second sealing tooth.

19. The apparatus of claim 18 wherein the first sealing tooth is spaced from the second sealing tooth;

wherein said parent tooth has a first sloping side and a second sloping side; and wherein said first sealing tooth extends from the first sloping side and said second sealing tooth extends from the second sloping side.

20. The apparatus of claim 18 wherein:

said first sealing tooth extends from the parent tooth for biting into the pipe;

said second sealing tooth extends from the parent tooth for biting into the pipe; and a groove is located between the first sealing tooth and the second sealing tooth.

21. The apparatus of claim 20 wherein the groove located between the first sealing tooth means and the second sealing tooth means has a depth of about:

C4 (actual pipe outside diameter/T) exp. C5 where

T = (maximum pipe wall thickness and minimum pipe wall thickness)/2 where: C4 is in the range of about 0.001 to 0.005

C5 is in the range of about 0.1 to 0.5.

22. The apparatus of claim 20:

wherein the parent tooth has a ramp angle in the range of about 40° to 90°.

23. The apparatus of claim 18 wherein said parent tooth is substantially larger than either of the first sealing tooth and the second sealing tooth.

24. The apparatus of claim 18 wherein said parent tooth is substantially larger than either of the first sealing tooth or the second sealing tooth so that the parent tooth enhances the tensile strength of the first tooth means, and the first sealing tooth and the second sealing tooth allow the first tooth means to conform in sealing engagement with a pipe having an irregular outer surface.

25. An apparatus for making pipe connections comprising:

a coupling body with a first surface adapted for receiving a pipe, which pipe has an initial shape;

a swage ring means which is adapted for being urgeable relative to the pipe in order to cause at least part of the first surface to engage the pipe to create a seal;

said first surface of the coupling body describing a first tooth means for substantial biting into the pipe as said swage ring means is urged relative to the pipe;

said first surface describing a second tooth means for making at least a minimal bite into the pipe as said swage ring means is urged relative to the pipe;

a groove defined between the first tooth means and the second tooth means;

said groove defining a length between the first tooth means and the second tooth means;

said groove having a bottom and defining a depth which represents a distance that the first tooth means extend from the bottom;

wherein the length and depth of the groove are selected so that a portion of the pipe located between the first tooth means and the second tooth means substantially retains an initial shape after the swage ring means has caused the first tooth means and the second tooth means to bite into the pipe;

said first surface describing a third tooth means for making at least a minimal bite into the pipe as said swage ring means is urged relative to the pipe, said third tooth means located on the opposite side of the first tooth means for the second tooth means;

a second groove defined between the first tooth means and the third tooth means;

said second groove defining a second length between the first tooth means and the third tooth means;

said second groove having a second bottom and defining a second depth which represents a second distance that the first tooth means extend from the second bottom;

wherein the second length and the second depth of the second grooves are selected so that a second portion of the pipe located between the first tooth means and the third tooth means substantially retain an initial shape after the swage ring means has caused the first tooth means and the third tooth means to bite into the pipe; and wherein said first tooth means includes a parent tooth which defined a first sealing tooth spaced from a second sealing tooth.

26. The apparatus of claim 15 wherein said parent tooth is substantially larger than either of the first sealing tooth or the second sealing tooth so that the parent tooth enhances the tensile strength of the first tooth means, and the first sealing tooth and the second sealing tooth allow the first tooth means to conform in sealing engagement with a pipe having an irregular outer surface.

27. An apparatus for making pipe connections comprising:

a coupling body with a first surface adapted for receiving a pipe, which pipe has an initial shape;

a swage ring means which is adapted for being urgeable relative to the pipe in order to cause at least part of the first surface to engage the pipe to create a seal;

said first surface of the coupling body describing a first tooth means for substantial biting into the pipe as said swage ring means is urged relative to the pipe;

said first surface describing a second tooth means for making at least a minimal bite into the pipe as said swage ring means is urged relative to the pipe;

a groove defined between the first tooth means and the second tooth means;

said groove defining a length between the first tooth means and the second tooth means;

said groove having a bottom and defining a depth which represents a distance that the first tooth means extend from the bottom;

wherein the length and depth of the groove are selected so that a portion of the pipe located between the first tooth means and the second tooth means substantially retains an initial shape after the swage ring means has caused the first tooth means and the second tooth means to bite into the pipe; and wherein said first tooth means includes:

a parent tooth; and a first sealing tooth extending from the parent tooth for biting into the pipe.

28. The apparatus of claim 27 wherein said parent tooth is substantially larger than the sealing tooth so that the parent tooth enhances the tensile strength of the first tooth means, and the sealing tooth allows the first tooth means to conform in sealing engagement with a pipe having an irregular outer surface.

29. The apparatus of claim 27 wherein the width of the parent tooth in inches is about:

C1 [{(pipe outside diameter) (calculated burst pressure of pipe)}/C2(ultimate tensile strength of coupling body material)].

where:
C1 is in the range of about 0.2 to 1.2
C2 is in the range of about 2 to 6.

30. The apparatus of claim 29 wherein the width of the sealing tooth in inches is about:

C3 (width of parent tooth), where: C3 is in the range of about 0.01 to 0.5.

31. An apparatus for making pipe connections comprising:
a coupling body with a first surface adapted for receiving a pipe, which pipe has an initial shape;
a swage ring means which is adapted for being urgeable relative to the pipe in order to cause at least part of the first surface to engage the pipe to create a seal;
said first surface of the coupling body describing a first tooth means for substantial biting into the pipe as said swage ring means is urged relative to the pipe;
said first surface describing a second tooth means for making at least a minimal bite into the pipe as said swage ring means is urged relative to the pipe;
a groove defined between the first tooth means and the second tooth means;
said groove defining a length between the first tooth means and the second tooth means;
said groove having a bottom and defining a depth which represents a distance that the first tooth means extend from the bottom;
wherein the length and depth of the groove are selected so that a portion of the pipe located between the first tooth means and the second tooth means substantially retains an initial shape after the swage ring means has caused the first tooth means and the second tooth means to bite into the pipe;
said first surface describing a first position, said first position located on the opposite side of the first tooth means from the second tooth means;
a second groove defined between the first tooth means and the first position;
said second groove defining a second length between the first tooth means and the first position;
said second groove having a second bottom and defining a second depth which represents a second distance that the first tooth means extend from the second bottom;
wherein the second length and the second depth of the second grooves are selected so that a second portion of the pipe located between the first tooth means and the first position substantially retain an initial shape after the swage ring means has caused the first tooth means bite into the pipe;
wherein the coupling body defines a pipe receiving end and wherein said first position is located more distantly from the pipe receiving end than the first tooth means;
said first surface is an inner surface and said coupling body having an outer surface defining a reverse taper means for assisting the swage ring in urging the first tooth means to bite into the pipe, which reverse taper means protrudes a greater distance from the outer surface substantially adjacent to the first tooth means and slopes downwardly to a location substantially adjacent to the first position.

32. The apparatus of claim 31 wherein said second tooth means is located closer to the pipe receiving end than the first tooth means, wherein the length of the groove is sufficient to enable the second tooth means to prevent the pipe from bending and prevent relative motion between the pipe and the first tooth means.

33. The apparatus of claim 31 wherein said first tooth means includes:
a parent tooth; and
a first sealing tooth extending from the parent tooth for biting into the pipe.

34. An apparatus for making pipe connections comprising:
a coupling body with a first surface adapted for receiving a pipe;
a swage ring means adapted for being urgeable relative to the pipe in order to cause at least part of the first surface to engage the pipe to create a seal;
said first surface of the coupling body describing a first tooth means for making a substantial bite into the pipe as said swage ring means is urged relative to the pipe;
said first surface describing a second tooth means for making at least a minimal bite into the pipe as said swage ring means is urged relative to the pipe;
a groove defined between the first tooth means and the second tooth means;
said groove defining a length between the first tooth means and the second tooth means;
said groove having a bottom and defining a depth which represents a distance that the first tooth means and the second tooth means extend from the bottom;
wherein the length and depth of the groove are selected so that should a portion of the pipe located between the first tooth means and the second tooth means come into contact with the bottom of the recess, the pipe will not be substantially pushed away from the first tooth means and the second tooth means so as not to substantially affect the biting engagement of the first tooth means with the pipe and the biting engagement of the second tooth means with the pipe;
said first surface describes a first position located on the opposite side of the first tooth means from the second tooth means;
a second groove defined between the first tooth means and the first position;
said second groove defining a second length between the first tooth means and the first position;
said second groove having a second bottom and defining a second depth which represents a second distance that the first tooth means and the first position extend from the second bottom;
wherein the second length and the second depth of the second grooves are selected so that should a second portion of the pipe located between the first tooth means and the first position comes into contact with the second bottom of the second recess, the pipe will not be substantially pushed away from the first tooth means so as not to substantially affect the biting engagement of the first tooth means with the pipe;
wherein the coupling body defines a pipe receiving end and wherein said first position is located more distantly from the pipe receiving end than the first tooth defining means; and said first surface is an inner surface and said coupling body having an outer surface defining a reverse taper means for assisting the swage ring in urging the first tooth means into biting engagement with the pipe, which reverse taper means protrudes a greater distance from the outer surface substantially adjacent to the first tooth means and slopes downwardly to a location substantially adjacent to the first position.

35. The apparatus of claim 34 wherein said first tooth means includes:

a parent tooth; and a first sealing tooth extending from the parent tooth for biting into the pipe.

* * * * *